United States Patent [19]
Cao

[11] Patent Number: 6,130,971
[45] Date of Patent: Oct. 10, 2000

[54] FIBER OPTIC DENSE WAVELENGTH DIVISION MULTIPLEXER WITH A PHASE DIFFERENTIAL METHOD OF WAVELENGTH SEPARATION UTILIZING A POLARIZATION BEAM SPLITTER AND A NONLINEAR INTERFEROMETER

[75] Inventor: Simon X. F. Cao, San Mateo, Calif.

[73] Assignee: Avanex Corporation, Fremont, Calif.

[21] Appl. No.: 09/129,635

[22] Filed: Aug. 6, 1998

[51] Int. Cl.$^7$ ...................................................... G02B 6/26
[52] U.S. Cl. ................... 385/31; 385/24; 385/20; 385/33; 385/36; 356/352; 359/131
[58] Field of Search ............................ 385/31–38, 14–24; 356/352; 359/131

[56] References Cited

U.S. PATENT DOCUMENTS

| | | | |
|---|---|---|---|
| 4,412,720 | 11/1983 | Costa ........................................ | 385/36 |
| 5,056,887 | 10/1991 | Ohshima ................................... | 385/36 |
| 5,223,975 | 6/1993 | Naganuma et al. .................... | 385/36 X |
| 5,321,774 | 6/1994 | Barnard et al. ........................ | 385/36 X |
| 5,402,509 | 3/1995 | Fukushima ............................. | 385/36 X |

OTHER PUBLICATIONS

"Multifunction optical filter with a Michelson–Gires–Tournois interferometer for wavelength–division–multiplexed network system applications," Optics Letters, Jul. 15, 1998, vol. 23, No. 14.

*Primary Examiner*—Phan T. H. Palmer
*Attorney, Agent, or Firm*—Sawyer Law Group LLP

[57] ABSTRACT

A dense wavelength division multiplexer for separating an optical signal into optical channels is provided. The dense wavelength division multiplexer of the present invention includes a manner for inputting an optical signal where the optical signal comprises a plurality of optical channels; a manner for separating one or more of the plurality of optical channels by introducing a phase difference between at least two of the plurality of optical channels, where the manner of separation includes a polarization beam splitter; and a manner for outputting the separated plurality of optical channels along a plurality of optical paths. The dense wavelength division multiplexer of the present invention provides an ease in alignment and a higher tolerance to drifts due to the increase in the width of the pass band. Its separators may also be placed in a multi-stage parallel cascade configuration to provide for a lower insertion loss. It may also be easily modified to perform the add/drop function as it separates channels. The material required to manufacture and implement the dense wavelength division multiplexer is readily available and do not require special or expensive materials or processes. It is thus cost effective.

4 Claims, 10 Drawing Sheets

When $\lambda = \lambda_1, \lambda_3, \ldots, \lambda_{2n+1}$

FIG. 6

When $\lambda = \lambda_2, \lambda_4, \ldots, \lambda_{2n}$

FIBER OPTIC DENSE WAVELENGTH DIVISION MULTIPLEXER WITH A PHASE DIFFERENTIAL METHOD OF WAVELENGTH SEPARATION UTILIZING A POLARIZATION BEAM SPLITTER AND A NONLINEAR INTERFEROMETER

FIELD OF THE INVENTION

The present invention relates to fiber optic networks, and more particularly to fiber optic wavelength division multiplexers.

BACKGROUND OF THE INVENTION

Fiber optic networks are becoming increasingly popular for data transmission due to their high speed, high capacity capabilities. Multiple wavelengths may be transmitted along the same optic fiber. These wavelengths are sent combined to provide a single transmitted signal. A crucial feature of a fiber optic network is the separation of the optical signal into its component wavelengths, or "channels", typically by a wavelength division multiplexer. This separation must occur in order for the exchange of wavelengths between signals on "loops" within networks to occur. The exchange occurs at connector points, or points where two or more loops intersect for the purpose of exchanging wavelengths.

Add/drop systems exist at the connector points for the management of the channel exchanges. The exchanging of data signals involves the exchanging of matching wavelengths from two different loops within an optical network. In other words, each signal drops a channel to the other loop while simultaneously adding the matching channel from the other loop.

Figure 1:
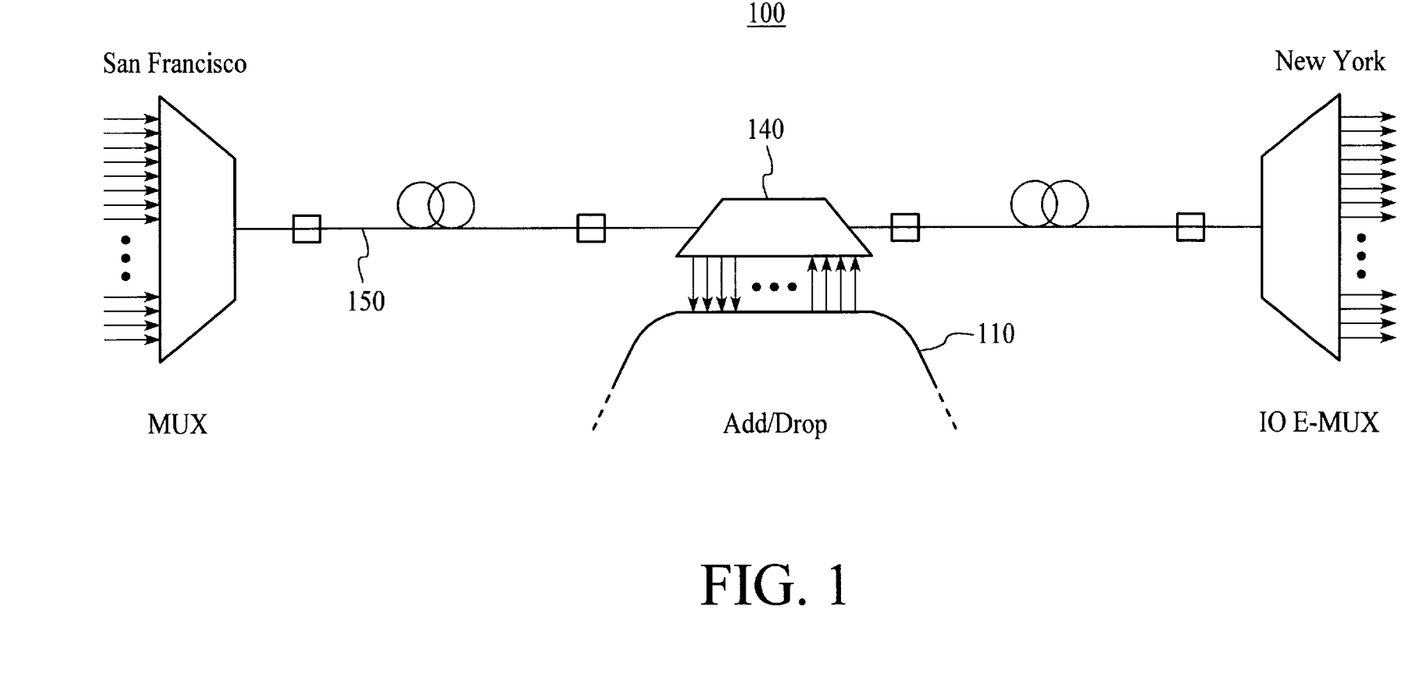
FIG. 1 is an illustration of a simplified optical network.

FIG. 1 illustrates a simplified optical network 100. A fiber optic network 100 could comprise a main loop 150 which connects primary locations, such as San Francisco and New York. In-between the primary locations is a local loop 110 which connect with loop 150 at connector point 140. Thus, if local loop 110 is Sacramento, wavelengths at San Francisco are multiplexed into an optical signal which will travel from San Francisco, add and drop channels with Sacramento's signal at connector point 140, and the new signal will travel forward to New York where it is demultiplexed into individual wavelengths. Within loop 110, optical signals would be transmitted to various locations within its loop, servicing the Sacramento area. Local receivers (not shown) would reside at various points within the local loop 110 to convert the optical signals into the electrical signals in the appropriate protocol format.

Figure 2:
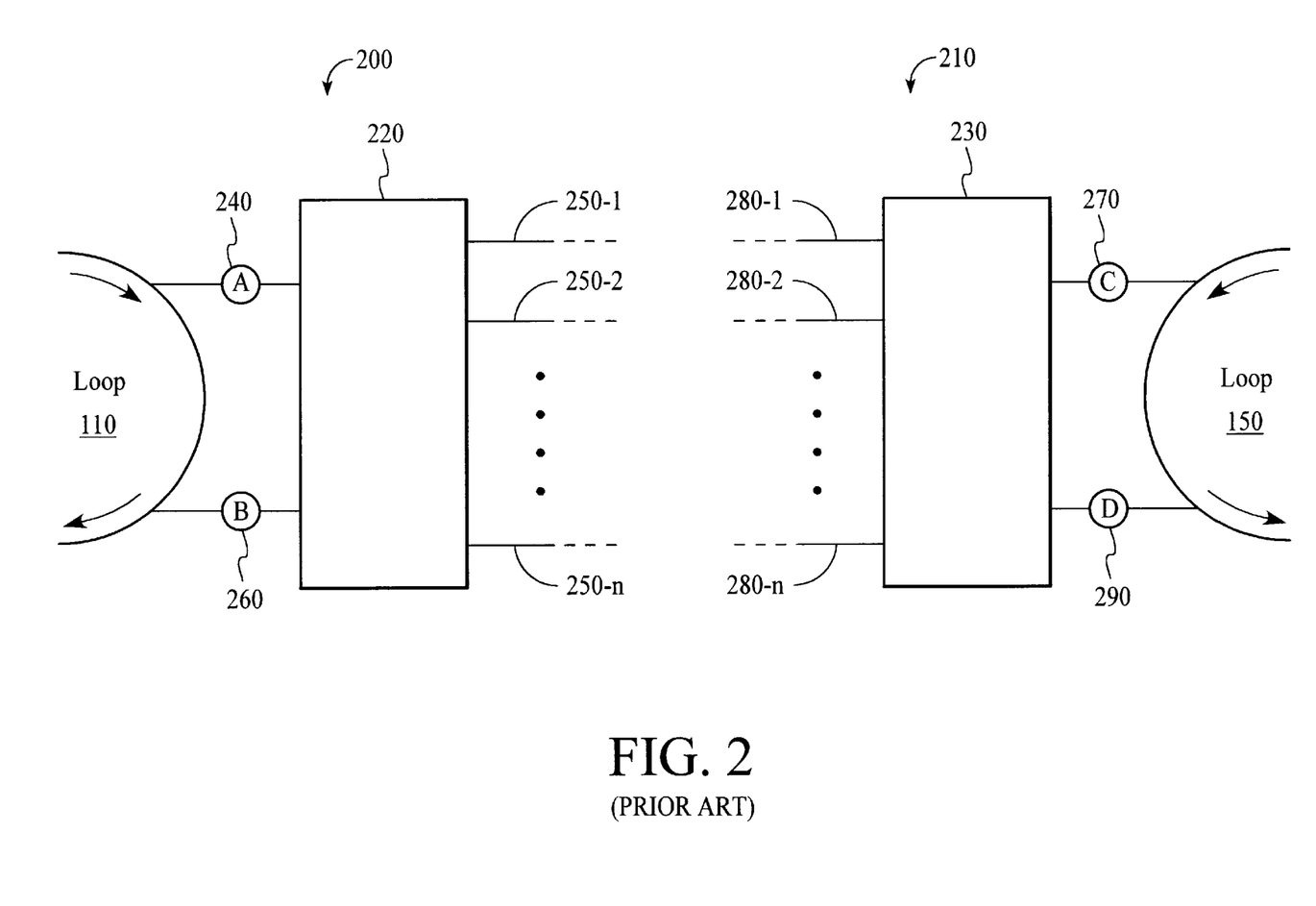
FIG. 2 is an illustration of conventional add/drop systems and dense wavelength division multiplexers.

The separation of an optical signal into its component channels are typically performed by a dense wavelength division multiplexer. FIG. 2 illustrates add/drop systems 200 and 210 with dense wavelength division multiplexers 220 and 230. An optical signal from Loop 110 ($\lambda_1$–$\lambda_n$) enters its add/drop system 200 at node A (240). The signal is separated into its component channels by the dense wavelength division multiplexer 220. Each channel is then outputted to its own path 250-1 through 250-n. For example, $\lambda_1$ would travel along path 250-1, $\lambda_2$ would travel along path 250-2, etc. In the same manner, the signal from Loop 150 ($\lambda_1'$–$\lambda_n'$) enters its add/drop system 210 via node C (270). The signal is separated into its component channels by the wavelength division multiplexer 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred to path 280-1. It is combined with the others of Loop 150's channels into a single new optical signal by the wavelength division multiplexer 230. The new signal is then returned to Loop 150 via node D (290). At the same time, $\lambda_1'$ is transferred to path 250-1 from 280-1. It is combined with the others of Loop 110's channels into a single optical signal by the wavelength division multiplexer 220. This new signal is then returned to Loop 110 via node B (260). In this manner, from Loop 110's point of view, channel $\lambda_1$ of its own signal is dropped to Loop 150 while channel $\lambda_1'$ of the signal from Loop 150 is added to form part of its new signal. The opposite is true from Loop 150's point of view. This is the add/drop function.

Conventional methods used by dense wavelength division multiplexers in separating an optical signal into its component channels includes the use of filters and fiber gratings as separators. A "separator," as the term is used in this specification, is a unit of optical components which separates one or more channels from an optical signal. Filters allow a target channel to pass through while redirecting all other channels. Fiber gratings target a channel to be reflected while all other channels pass through. Both filters and fiber gratings are well known in the art and will not be discussed in further detail here.

Figure 3:
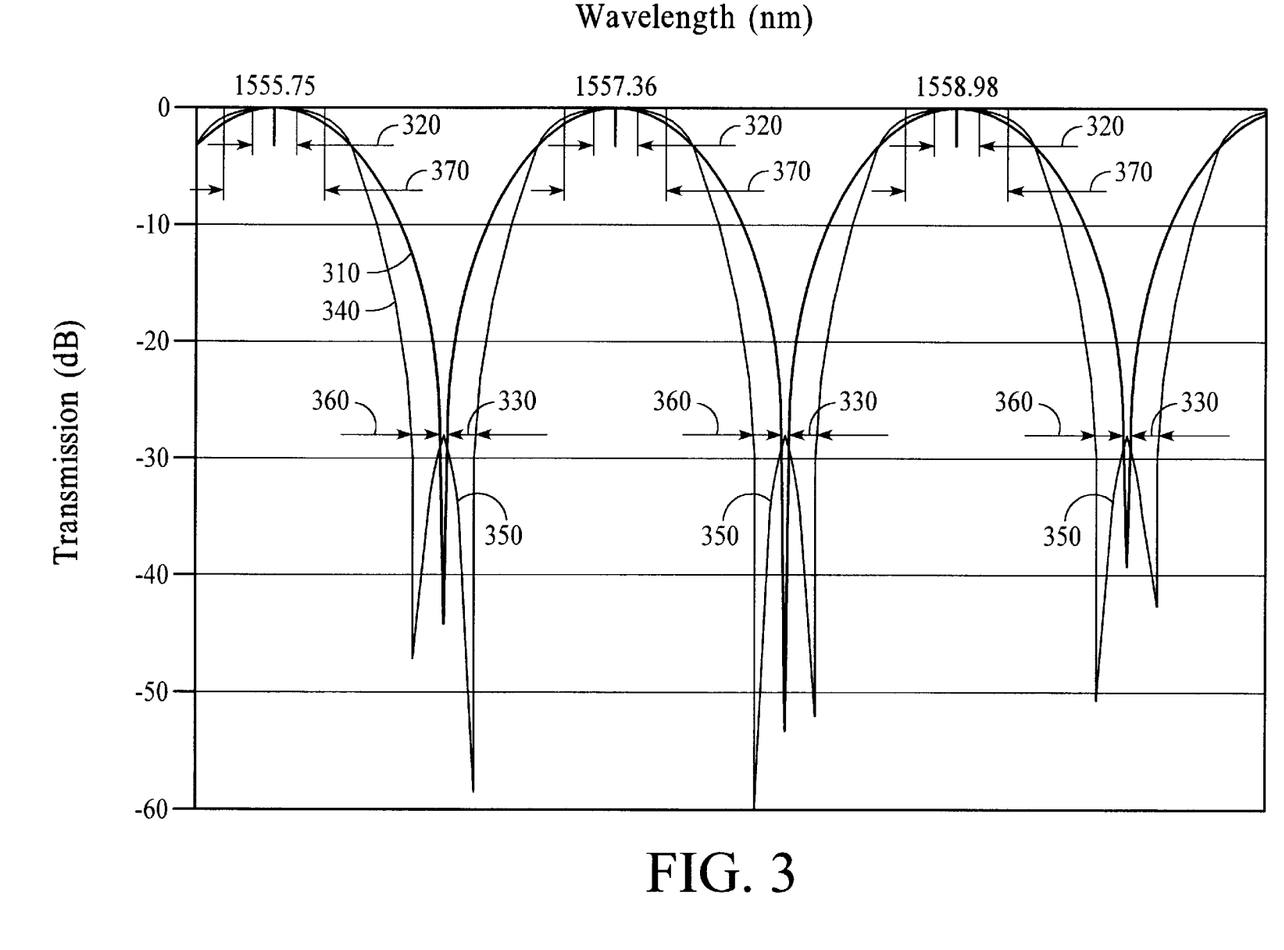
FIG. 3 is a graph of a sample spectrum curve of channels as they enter a conventional dense wavelength division multiplexer and a dense wavelength division multiplexer in accordance with the present invention.

A problem with the conventional separators is the precision required of a device for transmitting a signal into an optic fiber. A signal entering a dense wavelength division multiplexer has a very narrow pass band. FIG. 3 shows a sample spectrum curve 310 of channels as it enters a dense wavelength division multiplexer. The pass band 320 of the channels are very narrow. Ideally, the curve would be a square wave. A narrow pass band is problematic because due to the physical limitations and temperature sensitivity of signal transmitting laser devices, they never transmit light exactly to the center wavelength of an optic filter. The amount off center is called the "offset." The amount of drift ideally should not be larger than the width of the pass band. Otherwise, crosstalk between channels will be too large. Crosstalk occurs when one channel or part of a channel appears as noise on another channel adjacent to it. Since the signals resulting from the conventional configurations have a narrow pass band, the signal transmitting devices, such as lasers or the like, must be of a high precision so that offset is limited to the width of the pass band. This high precision is difficult to accomplish. Signal transmitting devices of high precision is available but are very expensive. Also, the signal transmitting devices much be aligned individually for each separator, which is time intensive.

Therefore, there exists a need for a wavelength division multiplexer with a method of separation which has a greater tolerance for wavelength offset and is easier to align. This method should also be cost effective to implement. The present invention addresses such a need.

SUMMARY OF THE INVENTION

A dense wavelength division multiplexer for separating an optical signal into optical channels is provided. The wavelength division multiplexer of the present invention includes an inputting mechanism for an optical signal where the optical signal comprises a plurality of optical channels; a separating mechanism for one or more of the plurality of optical channels by introducing a phase difference between at least two of the plurality of optical channels, where the separating mechanism separates at least partially based on the polarity of the plurality of optical channels; and an outputting mechanism for separating the plurality of optical channels along a plurality of optical paths. The dense wavelength division multiplexer of the present invention provides an ease in alignment and a higher tolerance to offsets due to the increase in the width of the pass band. Its separators may also be placed in a multi-stage parallel cascade configuration to provide for a lower insertion loss. It may also be easily modified to perform the add/drop function as it separates channels. The material required to manufacture and implement the wavelength division multiplexer is readily available and do not require special or expensive materials or processes. It is thus cost effective.

DETAILED DESCRIPTION

The present invention relates to an improvement in a dense wavelength division multiplexer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A dense wavelength division multiplexer (DWDM) in accordance with the present invention provides for a higher tolerance to drifts and ease of alignment. Its separators may be placed in a multi-stage parallel cascade configuration to reduce insertion loss. The present invention may also be easily modified to perform the add/drop function as it separates channels. The method does not require special or expensive materials or processes, and thus is cost effective to implement.

To more particularly describe the features of the present invention, please refer to FIGS. 4 through 10 in conjunction with the discussion below.

Figure 4:
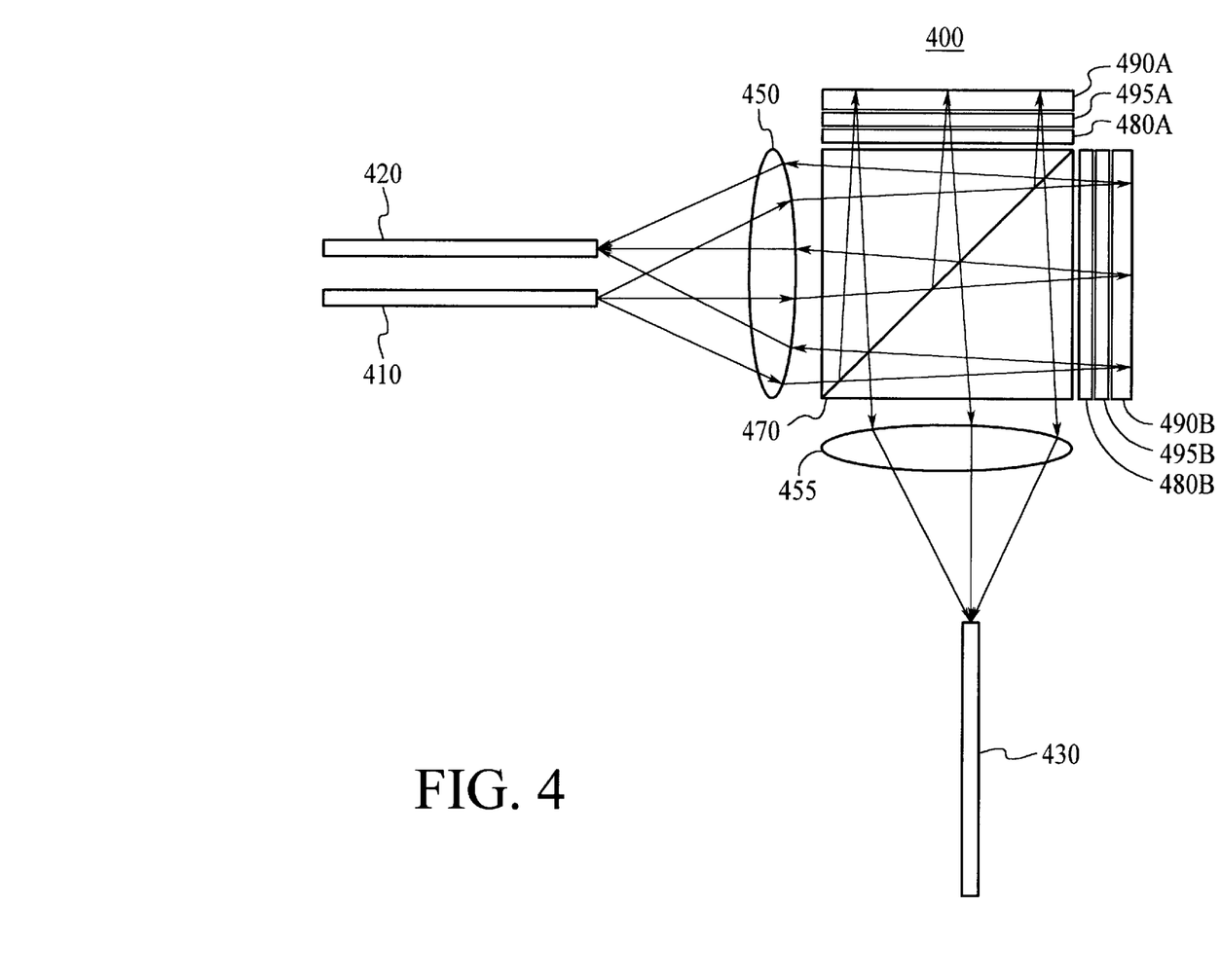
FIG. 4 is an illustration of a preferred embodiment of a separator in accordance with the present invention.

An important feature of the DWDM of the present invention is the structure of its separators. FIG. 4 illustrates a top view of a preferred embodiment of a separator in accordance with the present invention. The separator 400 comprising an optic fiber 410 for inputting an optical signal and optic fibers 420 and 430 for outputting optical signals. As the signal leaves the optic fiber 410, it diffuses. A lens 450 contains the signal and directs it toward a polarization beam splitter 470 which decomposes the signal based on its polarity. The portion of the signal vertical to a plane in the splitter 470 is reflected toward an interferometer 490A. The portion of the signal parallel to the plane in the splitter 470 passes through toward an interferometer 490B. The interferometers 490A and 490B introduce phase differences between the even and odd channels of the S polarization light and P polarization light respectively.

Figure 5:
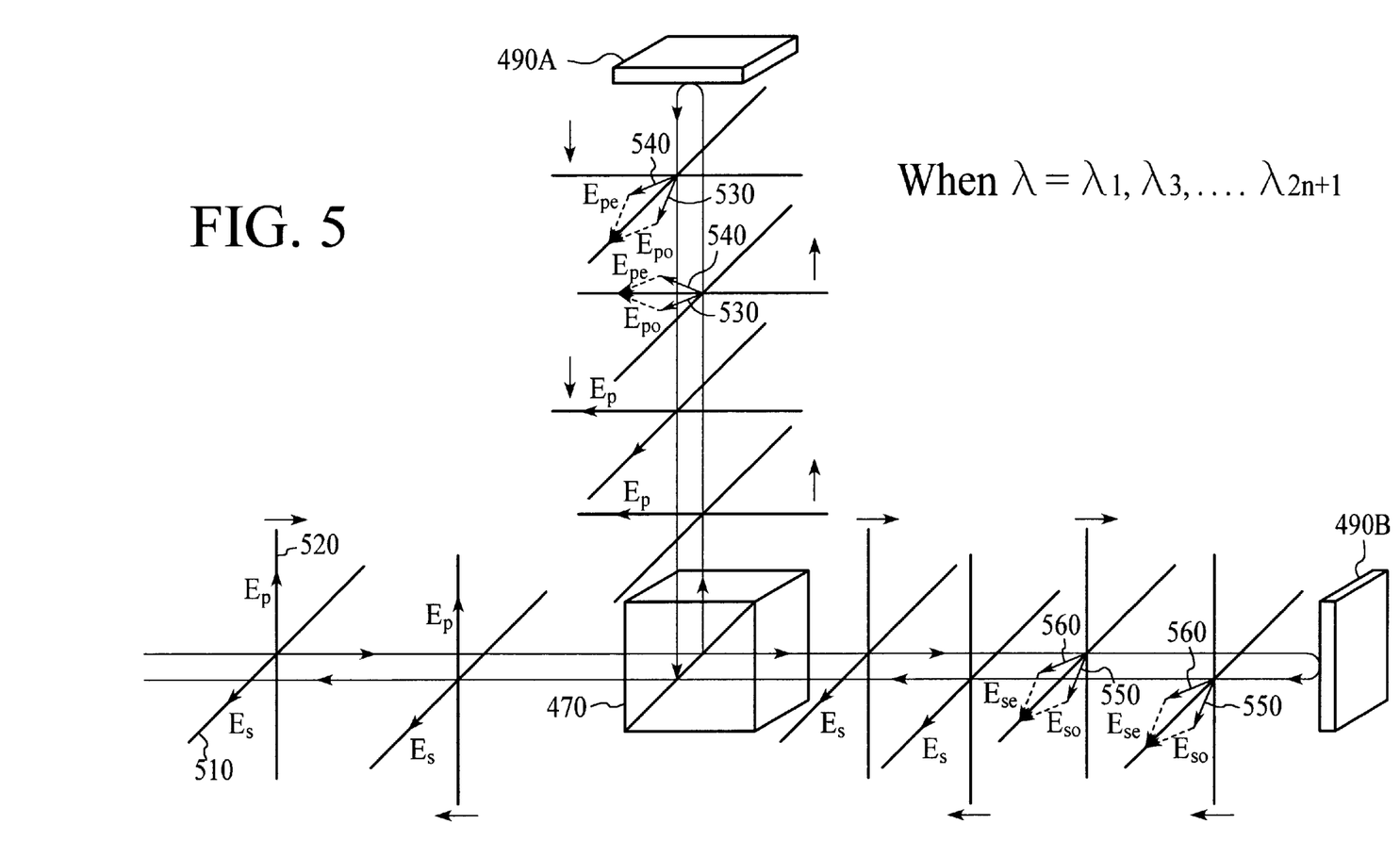
FIG. 5 is an illustration of odd channels traveling through a separator in accordance with the present invention.

FIG. 5 illustrates the odd channels as they travel through the separator 400 of the present invention. The odd channels travel to the polarization beam splitter 470 from the input fiber 410 (FIG. 4). Each channel has an S polarity component ($E_s$) 510 and a P polarity component ($E_p$) 520. As the odd channels travel through the polarization beam splitter 470, $E_p$ 520 and $E_s$ 510 are decomposed to its $E_o$ and $E_e$ components, with respect to the birefragment interferometer with an optical axis designated at 45 degrees with respect to the P polarization 520 or the S polarization 510. These components of light are well known in the art and will not be further discussed here. $E_{po}$ 530 and $E_{pe}$ 540 travel to the interferometer 490A while $E_{so}$ 550 and $E_{se}$ 560 travel to the interferometer 490B. Both sets of signals are reflected by their interferometers 490A and 490B without a phase difference between the $E_{po}$ 530 and $E_{pe}$ 540 (or $E_{so}$ 550 and $E_{se}$ 560). Thus, $E_{pe}$ 530 and $E_{po}$ 540 travel back to the polarization beam splitter 470 as $E_{pe}$ 530 and $E_{po}$ 540 signals, and $E_{so}$ 550 and $E_{se}$ 560 travel back as $E_{so}$ 550 and $E_{se}$ 560 signals. These signals then travel through the polarization beam splitter 470 to output fiber 420 (FIG. 4).

Figure 6:
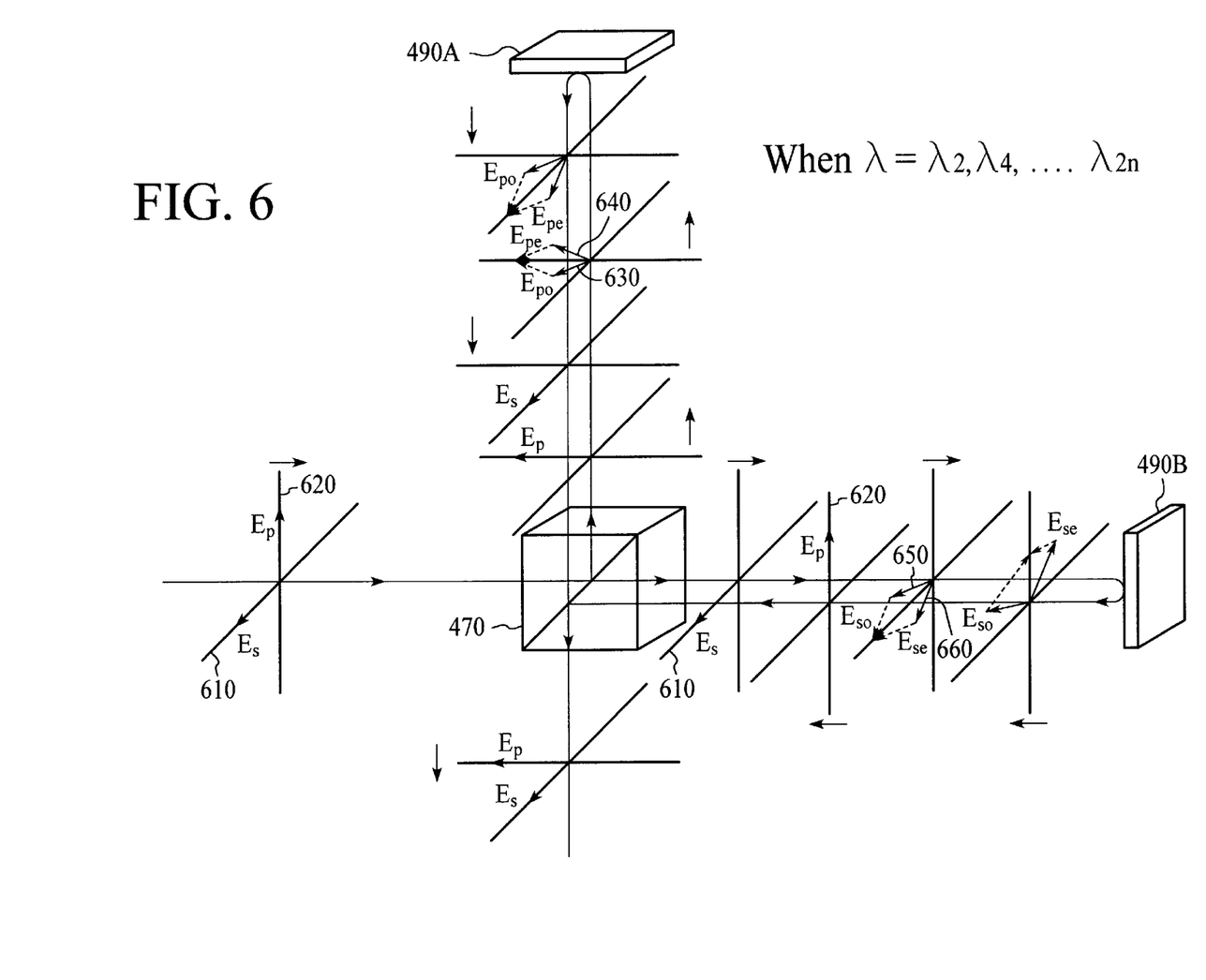
FIG. 6 is an illustration of even channels traveling through a separator in accordance with the present invention.

FIG. 6 illustrates the even channels as they travel through the separator 400 of the present invention. As with the odd channels, the even channels travel to the polarization beam splitter 470 from the input fiber 410 (FIG. 4). Each channel has an S polarity component ($E_s$) 610 and a P polarity component ($E_p$) 620. As the even channels travel through the polarization beam splitter 470, $E_p$ 620 and $E_s$ 610 are decomposed to its $E_o$ and $E_e$ components. $E_{po}$ 630 and $E_{pe}$ 640 travel to the interferometer 490A while $E_{so}$ 650 and $E_{se}$ 660 travel to the interferometer 490B. Interferometers 490A and 490B introduce a $\pi$ phase difference between $E_{po}$ 630 and $E_{pe}$ 640 and also between $E_{so}$ 650 and $E_{se}$ 660 respectively. When both sets of signals travel through the polarization beam splitter 470 again, their phase differences cause them to travel to output fiber 430 (FIG. 4). Thus, in this manner, output fiber 420 contains the odd channels while out put fiber 430 contains the even channels.

Figure 7:
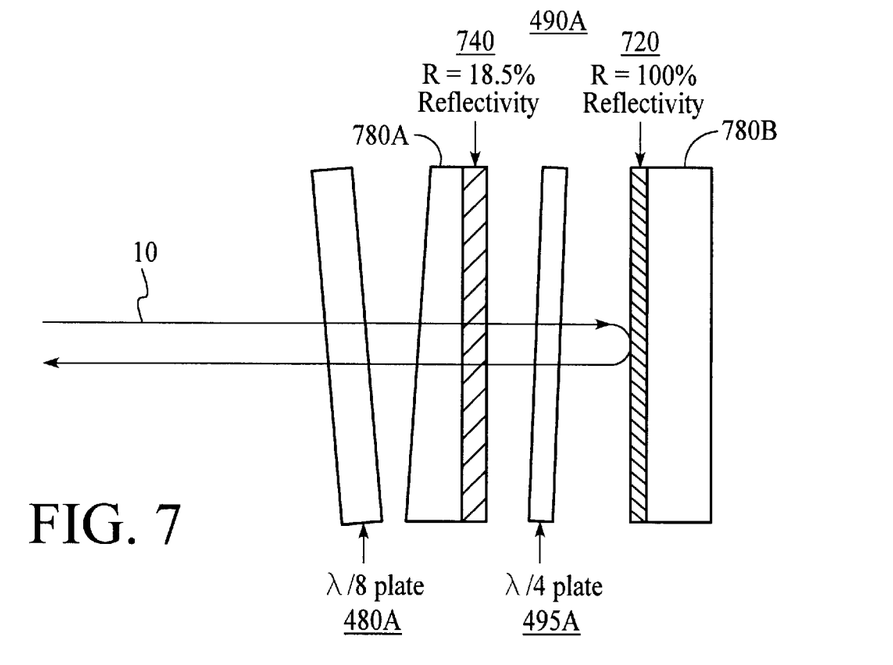
FIG. 7 is an illustration of a first embodiment of a nonlinear interferometer used with a separator in accordance with the present invention.

FIG. 7 illustrates a preferred embodiment of an interferometer which may be used with the separator 400 in accordance with the present invention. This interferometer has been disclosed in co-pending U.S. Patent Application entitled "Nonlinear Interferometer for Fiber Optic Dense Wavelength Division Multiplexer Utilizing a Phase Differential Method of Wavelength Separation," Ser. No. 09/247, 253, filed on Feb. 10, 1999 Applicant hereby incorporates the application by reference.

The interferometer 490A comprises two glass plates 780A–780B. The inside face of the glass plate 780B is coated with a layer of reflective coating 720 with a reflectivity preferably of 100%. The inside face of the glass plate 780A is coated with a layer of reflective coating 740 with a reflectivity preferably of approximately 18%. The working principle of the interferometer 490A is described in detail in the above referenced patent application, Ser. No. 09/247,253. Interferometer 490B has the same structure and functions in the same manner as interferometer 490A.

The preferred embodiment of the interferometer as illustrated in FIG. 7 is temperature sensitive. The rear glass plate 780B and the waveplate 495A will expand/contract with changes in temperature. These expansions/contractions will change the length of separation between them, varying the functioning of the interferometer 490A.

Figure 8:
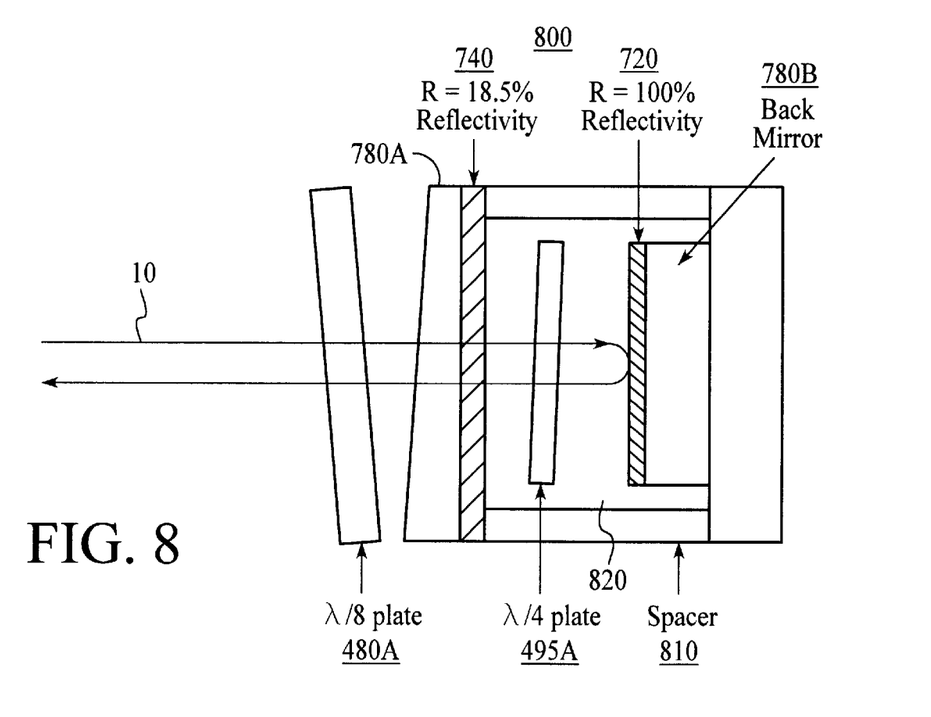
FIG. 8 is an illustration of a second embodiment of a nonlinear interferometer used with a separator in accordance with the present invention.

FIG. 8 illustrates a second embodiment of the interferometer which is temperature compensated and which may be used with the separator 400 in accordance with the present invention. This interferometer has also been disclosed in co-pending U.S. patent application, Ser. No. 09/247,253. The structure of the interferometer 800 is the same as the interferometer 490A except the two glass plates 780A–780B are set apart by zero expansion cavity spacers 810, creating a main cavity 820. The zero expansion cavity spacers 810 do not expand/contract with changes in temperature. A temperature controller (not shown) may be coupled to the interferometer 800 so that the expansions of the glass plate 780B and the waveplate 495A cancel each other out, maintaining a constant distance between them.

Although the separator 400 of the present invention has been disclosed with interferometer structures illustrated in FIGS. 7 and 8, one of ordinary skill in the art will understand that other structures which introduces a phase difference between channels of an optical signal can be used without departing from the spirit and scope of the present invention.

Although the separator 400 of the present invention has been disclosed with a polarization beam splitter, one of ordinary skill in the art will understand that other methods of separating optical signals based on their polarity may be used without departing from the spirit and scope of the present invention.

By separating channels in this manner, the separator 400 of the present invention broadens the pass and isolation bands of the signals. As explained above, portions of the signal 10 travel multiple times back and forth through the interferometers 490A and 800 before substantially all portions of the signal 10 exits the interferometers 490A and 800. This allows the controlled changing of the shape of the signals nonlinearly such that the tips of the signal's curves are flattened and a small amount of crosstalk is allowed. The crystal plate 480A, preferably of $\lambda/8$, serves to optimize the wave shape of the signals for this purpose.

To illustrate the advantage of flattening the curve tips and allowing a small amount of crosstalk, please refer again to FIG. 3. FIG. 3 is a graph of spectrum curve 310 of a signal which would result from a traditional linear birefragment filter element. This curve 310 has no crosstalk but has a very narrow isolation band 330 and a narrow pass band 320. Spectrum curve 340 would result if the reflective coating 740 has a reflectivity of approximately 18%. There is a small amount of crosstalk 350, but because the crosstalk 350 is there, the isolation band 360 is significantly wider. In addition, the tips of the curve is flatter, resulting in a wider pass band 370. The amount of flattening and crosstalk allowed can be manipulated by selecting a reflective coating with a certain reflective index. Thus, the separator 400 of the present invention, through manipulation of its interferometers 490A and 490B (FIG. 4), can be used to broaden the pass and isolation bands, which makes the curve more stable and tolerant to drift.

Figure 9:
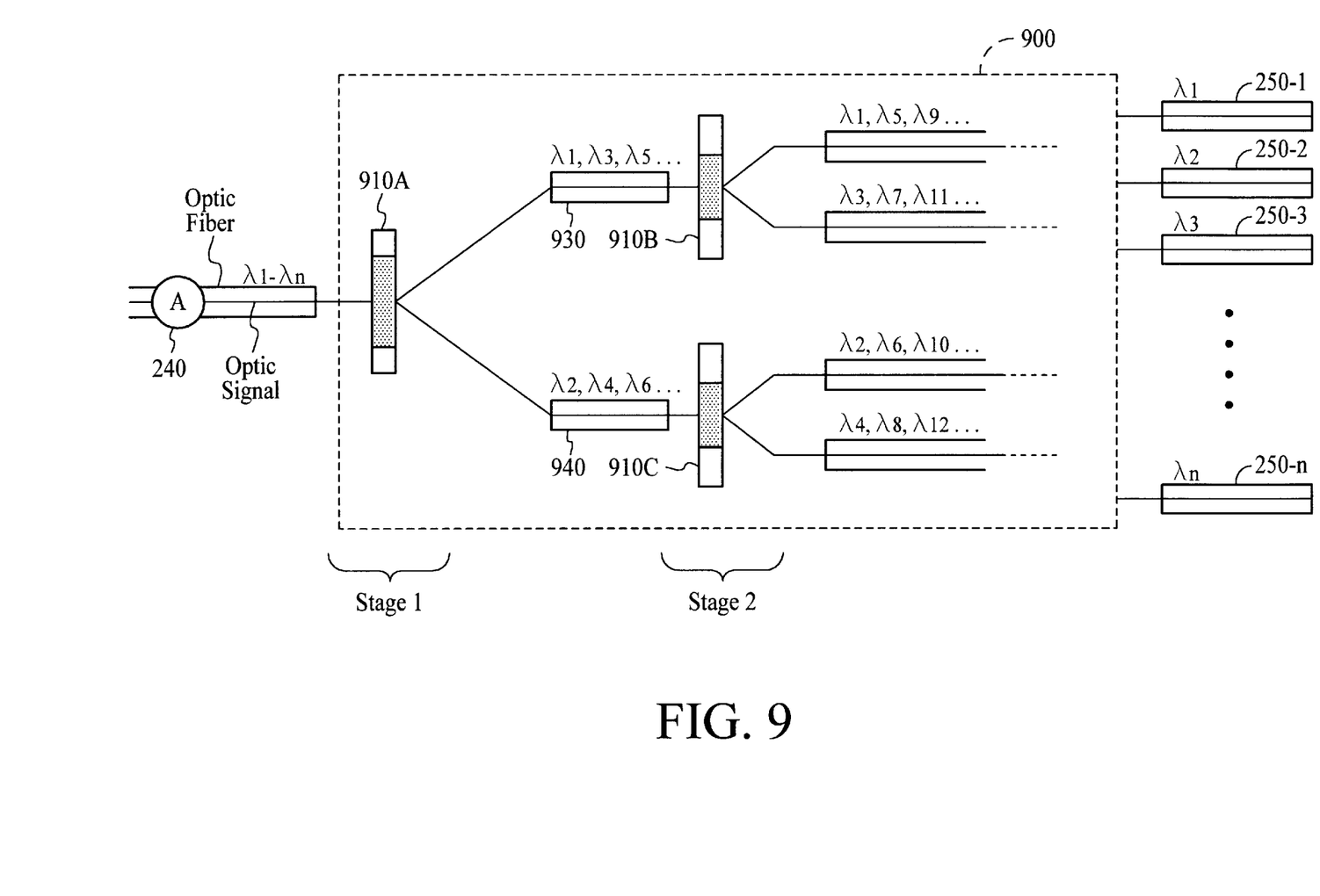
FIG. 9 is a simple block diagram of a dense wavelength division multiplexer with a multi-stage parallel cascade configuration of separators in accordance with the present invention.

An additional advantage of the separators 400 of the present invention is the ability to place them in a multi-stage parallel cascade configuration to reduce insertion loss. This configuration is illustrated in FIG. 9 and has been disclosed in co-pending U.S. Patent Application entitled "Fiber Optic Dense Wavelength Division Multiplexer Utilizing A Multi-Stage Parallel Cascade Method Of Wavelength Separation," Ser. No. 09/130,386, filed on Aug. 6, 1998. Applicant hereby incorporates the application by reference. In FIG. 9, an optical signal containing channels $\lambda_1-\lambda_n$ enters the DWDM of the present invention 900 through node A (240). The signal passes through a separator of the present invention 910A. The separator 910A divides the signal into two separate signals, one containing the odd channels ($\lambda_1, \lambda_3, \lambda_5, \ldots$) (930) and the other containing the even channels ($\lambda_2, \lambda_4, \lambda_6, \ldots$) (940), as described above with FIGS. 4 through 6. These odd and even channels are each passed through another separator 910B–910C which further divides them by every other channel. This division continues until only one channel is outputted to each optic fiber, 250-1 through 250-n.

Although the separators of the present invention has been described as being utilized with the multistage parallel configuration of the present invention, one of ordinary skill in the art will understand that the separators of the present invention may be utilized with other configurations without departing from the spirit and scope of the present invention.

Figure 10:
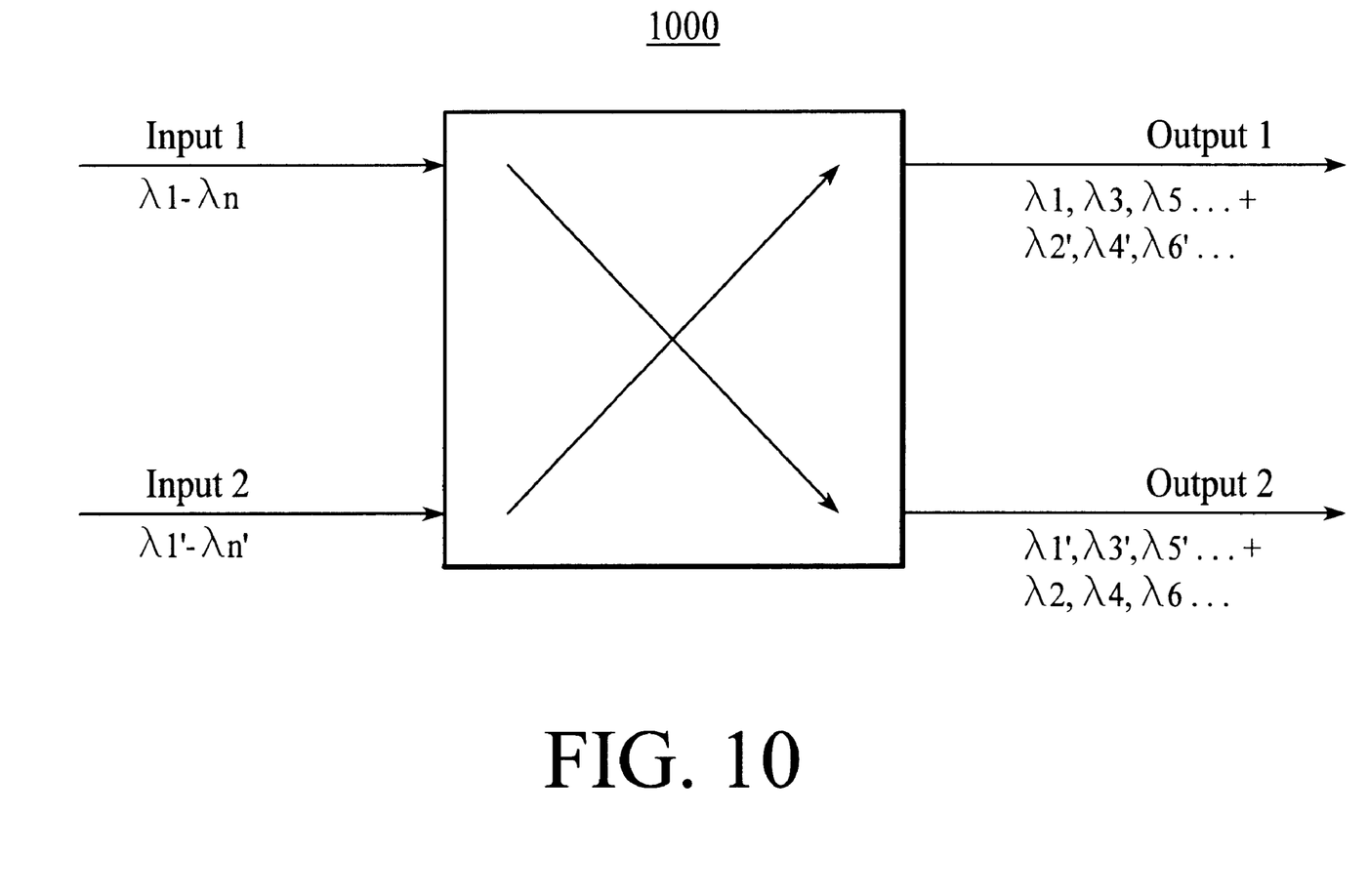
FIG. 10 is a simple block diagram of a separator in accordance with the present invention functioning as a 2×2 wavelength selective switch.

Another added functionality of a separator 400 of the present invention is the ability to perform the add/drop function while also separating the channels. FIG. 10 is a simple block diagram of a separator 1000 functioning as a 2×2 wavelength sensitive switch. As illustrated, two signals containing $\lambda_1-\lambda_n$ and $\lambda_1'-\lambda_n'$ are input into the separator 1000. Device 1000 then could drop the even channels of the first signal to the second signal while adding the even channels of the second signal to the first signal.

Figure 11:
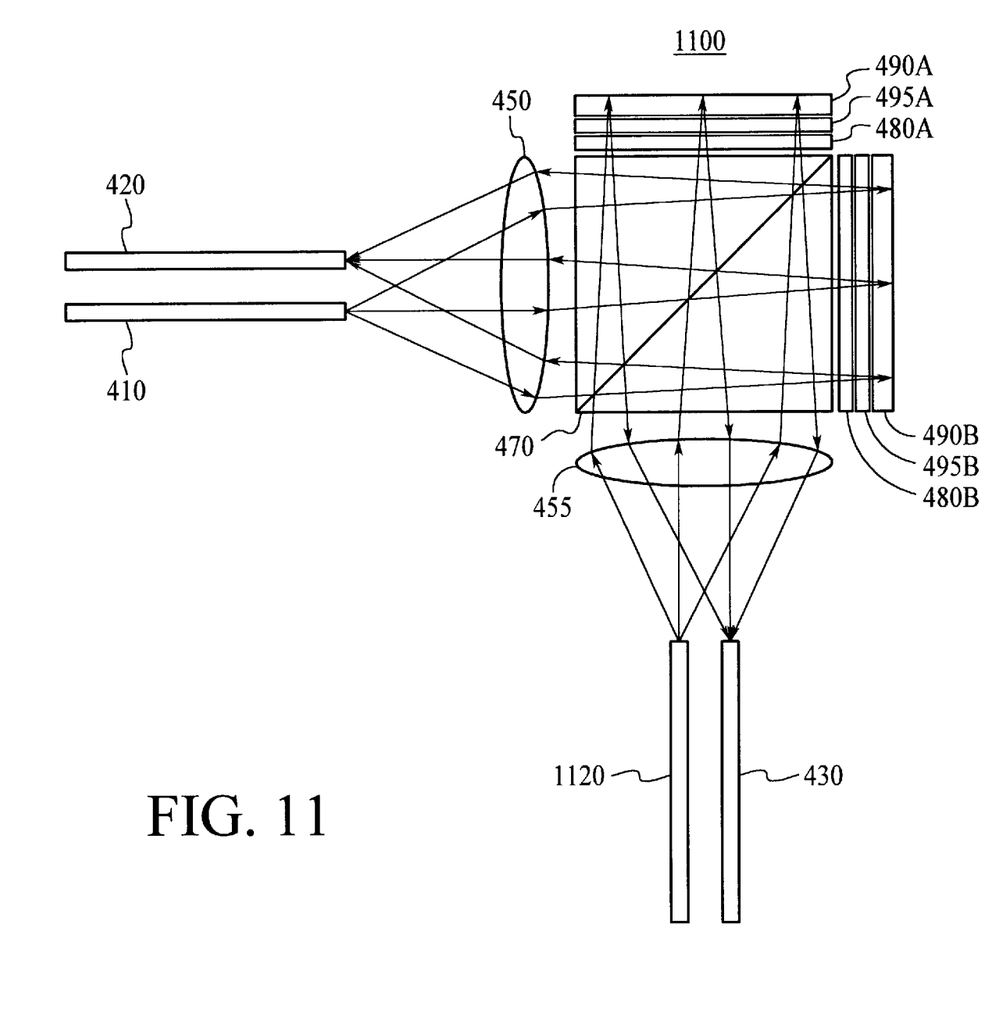
FIG. 11 is an illustration of a separator in accordance with the present invention performing the add/drop function.

To more particularly describe the utilization of a separator to perform the add/drop function, refer to FIG. 11 and the discussion below. FIG. 11 illustrates a separator 1100 in accordance with the present invention performing the add/drop function. The separator 1100 in FIG. 11 is identical to the separator 400 in FIG. 4 except for the input of a second signal containing $\lambda_1'-\lambda_n'$ via an additional optic fiber 1120. This second signal would be separated into its odd and even channels similarly to the first signal containing $\lambda_1-\lambda_n$. The result is that fiber 420 would contain the odd channels from the first signal ($\lambda_1, \lambda_3, \lambda_5, \ldots$) plus the even channels from the second signal ($\lambda_2', \lambda_4', \lambda_6', \ldots$). Fiber 430 would contain the even channels from the first signal ($\lambda_2, \lambda_4, \lambda_6, \ldots$) plus the odd channels from the second signal ($\lambda_1', \lambda_3', \lambda_5', \ldots$). By manipulating which separators in a wavelength division multiplexer performs the add/drop function, certain channels can be targeted.

A dense wavelength division multiplexer with a phase differential method of wavelength separation utilizing a polarization beam splitter and a nonlinear interferometer has been disclosed. The separators provide an ease in alignment and a higher tolerance to drifts due to the increase in the width of the pass band. They may also be placed in a multi-stage parallel cascade configuration to provide for a lower insertion loss by requiring an optical signal to travel through fewer optical components. The present invention may also be easily modified to perform the add/drop function as it separates channels. The materials required to manufacture and implement the dense wavelength division multiplexer in accordance with the present invention are readily available and do not require special or expensive materials or processes. It is thus cost effective.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dense wavelength division multiplexer for separating an optical signal into optical channels comprising:

means for inputting an optical signal, the optical signal comprising a plurality of optical channels;

means for separating one or more of the plurality of optical channels by introducing a phase difference between at least two of the plurality of optical channels, wherein the separating means is at least partially based on the polarity of the plurality of optical channels, wherein the separating means comprises a polarization beam splitter optically coupled to the lenses, and at least two nonlinear interferometers optically coupled to the polarization beam splitter, wherein the nonlinear interferometers (b) each comprise a first glass plate optically coupled to a second glass plate, forming a cavity; a first reflective coating residing inside the cavity and on the second glass plate; a second reflective coating residing inside the cavity and on the first glass plate; and a waveplate residing inside the cavity between the first and second glass plates; and means for outputting the separated plurality of optical channels along a plurality of optical paths.

2. A dense wavelength division multiplexer for separating an optical signal into optical channels comprising:

means for inputting an optical signal, the optical signal comprising a plurality of optical channels;

means for separating one or more of the plurality of optical channels by introducing a phase difference between at least two of the plurality of optical channels, wherein the separating means is at least partially based on the polarity of the plurality of optical channels, wherein the separating means comprises a polarization beam splitter optically coupled to the lenses, at least two nonlinear interferometers optically coupled to the polarization beam splitter, and at least two waveplates residing between each of the at least two nonlinear interferometers and the polarization beam splitter, wherein the waveplates are optically coupled to the nonlinear interferometers and the polarization beam splitter; and means for outputting the separated plurality of optical channels along a plurality of optical paths.

3. A dense wavelength division multiplexer for separating an optical signal into optical channels comprising:

(a) at least one of a first optic fiber for inputting an optical signal, the optical signal comprising a plurality of optical channels;

(b) at least one of a first lens optically coupled to the first optic fiber;

(c) at least two of a second optic fiber for outputting one or more optical channels, wherein at least one of the second optic fibers is optically coupled to the first lens;

(d) at least one of a second lens optically coupled to the second optic fibers which are not optically coupled to the first lens;

(e) a polarization beam splitter optically coupled to the lenses; and (f) at least two nonlinear interferometers optically coupled to the polarization beam splitter, wherein the nonlinear interferometers each comprise:

(f1) a first glass plate optically coupled to a second glass plate, forming a cavity;

(f2) a first reflective coating residing inside the cavity and on the second glass plate;

(f3) a second reflective coating residing inside the cavity and on the first glass plate; and (f4) a waveplate residing inside the cavity between the first and second glass plates.

4. A dense wavelength division multiplexer for separating an optical signal into optical channels comprising:

(a) at least one of a first optic fiber for inputting an optical signal, the optical signal comprising a plurality of optical channels;

(b) at least one of a first lens optically coupled to the first optic fiber;

(c) at least two of a second optic fiber for outputting one or more optical channels, wherein at least one of the second optic fibers is optically coupled to the first lens;

(d) at least one of a second lens optically coupled to the second optic fibers which are not optically coupled to the first lens;

(e) a polarization beam splitter optically coupled to the lenses;

(f) at least two nonlinear interferometers optically coupled to the polarization beam splitter; and (g) at least two waveplates residing between each of the at least two nonlinear interferometers and the polarization beam splitter, wherein the waveplates are optically coupled to the nonlinear interferometers and the polarization beam splitter.

* * * * *